Sept. 13, 1932.  W. L. PAUL  1,877,579
DRAFT ATTACHMENT
Filed Nov. 19, 1928  3 Sheets-Sheet 2

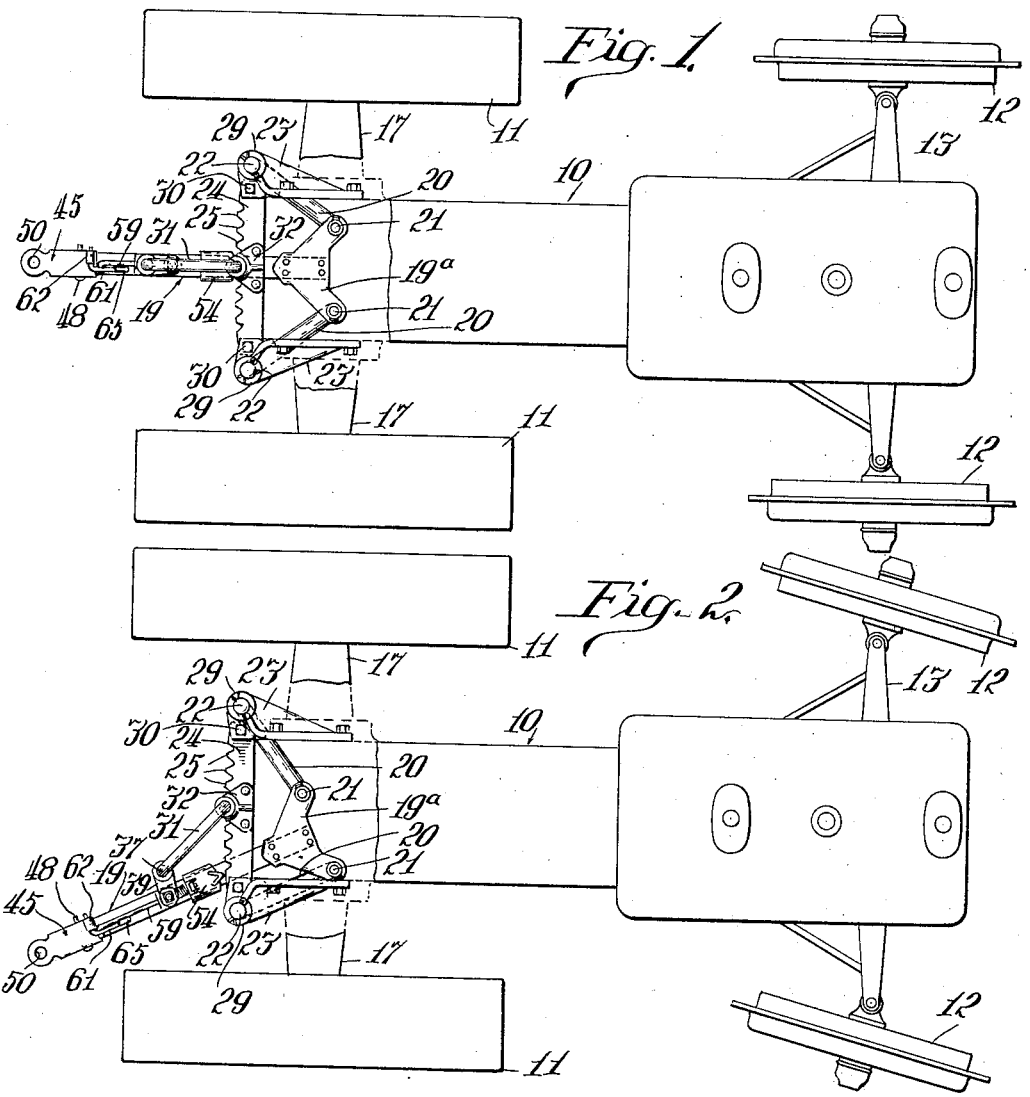

Witness
Milton Lenoir

Inventor.
William L. Paul,
By Brown, Jackson, Boettcher & Dienner.
Attorneys

Sept. 13, 1932.  W. L. PAUL  1,877,579
DRAFT ATTACHMENT
Filed Nov. 19, 1928   3 Sheets-Sheet 3
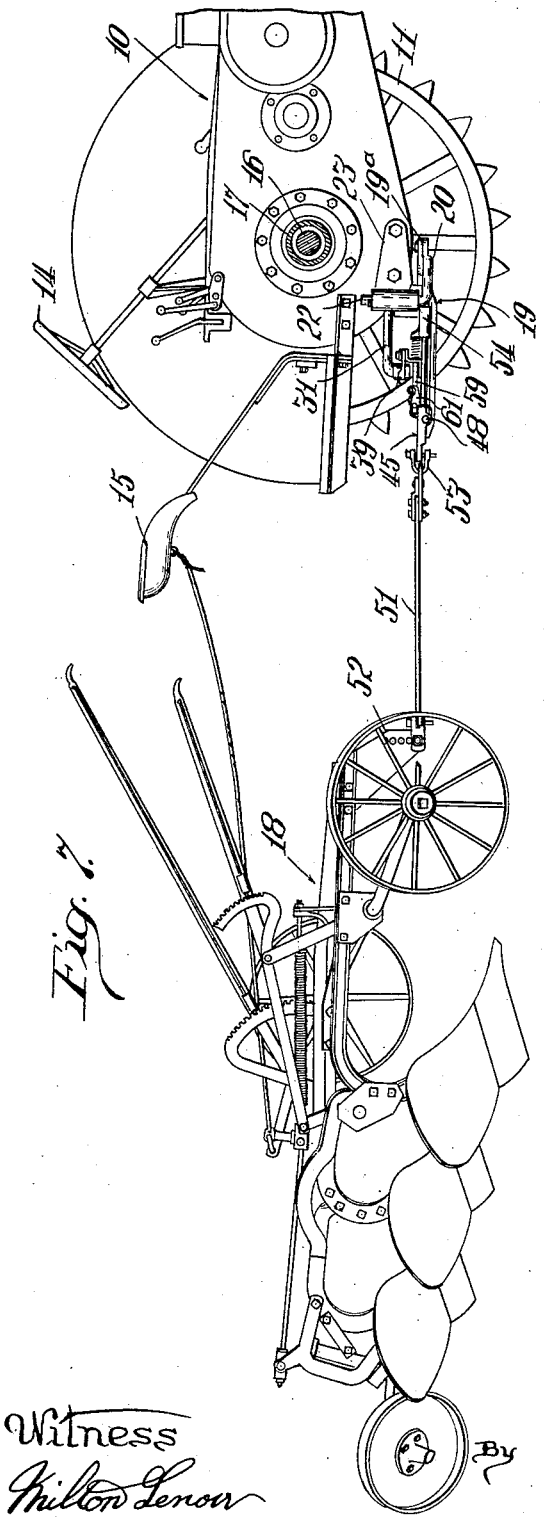
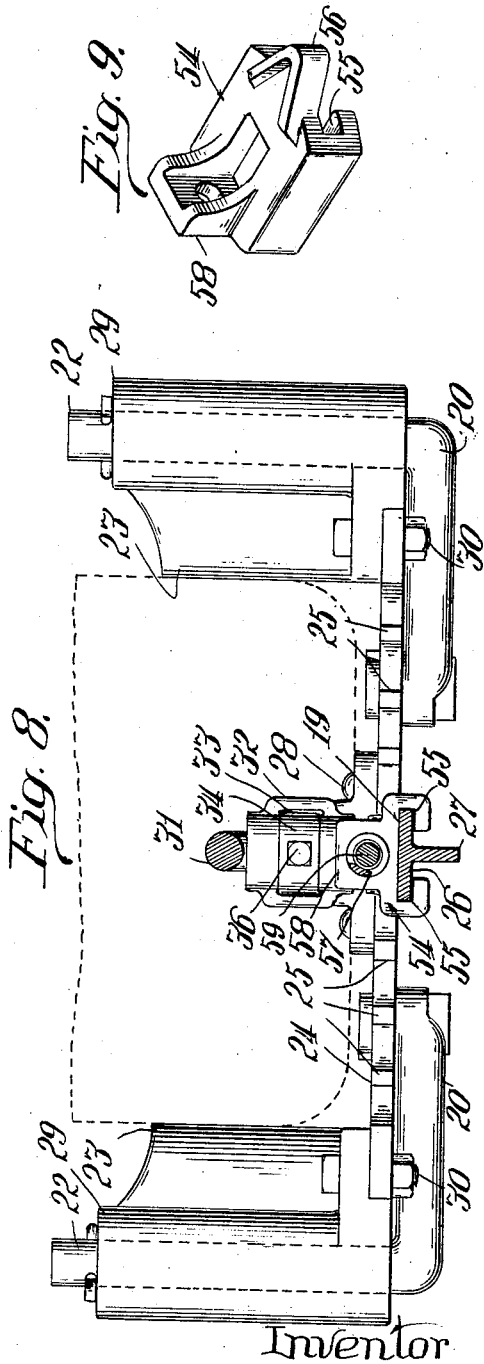

Patented Sept. 13, 1932

1,877,579

UNITED STATES PATENT OFFICE

WILLIAM L. PAUL, OF BERKELEY, CALIFORNIA, ASSIGNOR TO DEERE & COMPANY, OF MOLINE, ILLINOIS, A CORPORATION OF ILLINOIS

DRAFT ATTACHMENT

Application filed November 19, 1928. Serial No. 320,262.

This invention relates to draft attachments for tractors, of the general type shown and described in my pending application, Serial No. 136,436, filed September 20, 1926, having for their object the connection of a tractor, or other pulling vehicle, with a load, such as a farm implement, to be pulled thereby, in such manner that the tractor may be steered and maneuvered under load with maximum ease and certainty, and particularly around short turns. The difficulties ordinarily encountered in steering a tractor exerting a heavy draw bar pull around a short turn, arise primarily from the particular location of the point of hitch between the draft attachment and the tractor. With the ordinary draft attachment the hitch point of the load is generally back of the axis of the rear wheels of the tractor, and in such location the line of draft is such that the resistance of the load tends to resist lateral turning of the front end of the tractor when it is being steered through a sharp turn.

In my pending application above referred to I have shown and described a draft attachment which avoids the difficulties referred to by providing for the actual connection of the draw bar with the tractor frame, or corresponding part, at the rear portion thereof, and preferably back of the rear wheels, the draw bar being nevertheless arranged to swing laterally about a virtual pivot or hitch point located a considerable distance forward of the rear wheels and preferably approximately midway between the front and rear wheels. By such arrangement the physical connections between the draw bar and the tractor may be located high enough to give the necessary clearance without regard to the presence of downwardly extending parts of the tractor frame, located at points further forward, which would present obstacles to the free lateral swinging of the draw bar if it were to be actually connected with the tractor frame at such forward hitch point.

My present invention is in the nature of a modification of or improvement upon the structure disclosed in my said application, and it has primarily for its object the provision of means for locking the draw bar against lateral swinging when the load is being backed, at which time it is desirable that the draw bar be held rigid with reference to the tractor so far as lateral swinging is concerned, to prevent "jack-knifing". For instance, there are now on the market disc harrows that must be backed in order to straighten the gangs, and others that must be backed to angle the gangs, and as in normal operation of such implements it is desirable or necessary that the draw bar be capable of swinging laterally freely, to meet both conditions the draft connections should be arranged so that when the load is being drawn forward the draw bar may swing freely laterally, and when the tractor or other drawing power is being backed, the draw bar will be held against lateral swinging. This is accomplished by my present improvements.

Further objects are to provide improved means for connecting the draw bar with the tractor, so that it will be properly supported to swing laterally about a virtual pivot located forward of its physical pivotal connection with the tractor, and to provide means by which the locking devices, which hold the draw bar against lateral swinging when there is no load resistance, may be readily released manually to permit the draw bar to be swung laterally for convenience in hitching or unhitching the load. I accomplish these objects as illustrated in the drawings and as hereinafter described. What I regard as new is set forth in the claims. It is to be understood that the improved construction that constitutes the subject-matter of my present application is capable of the same uses as the construction described in my said pending application, and that the term "tractor" as used herein is intended to comprehend not only self-propelled vehicles, but any other form of vehicle used as a draft element to which the load to be hauled may be attached, as such construction is applicable for the attachment of various sorts of trailing loads to a leading vehicle or other structure, whether the latter be self-propelled, or be itself hauled by some suitable draft power.

In the accompanying drawings which illustrate the preferred embodiment of my invention,—

Fig. 1 is a plan view of a tractor with my improved draft attachment applied thereto, showing the position of the parts when the tractor is moving straight ahead;

Fig. 2 is a similar view showing the steering wheels of the tractor turned to the right, with the parts of the draft attachment in the position they assume when the tractor makes a right turn;

Fig. 3 is a fragmentary view showing in side elevation the hand latch for releasing the locking devices by which the draw bar is held against lateral swinging;

Fig. 7 is a side view illustrating the rear portion of the tractor with a gang plow hitched to it;

Fig. 8 is an enlarged vertical cross-section on line 8—8 of Fig. 6; and

Fig. 9 is a perspective view of the sliding block by which the draw bar is locked against lateral swinging.

Figure 4:
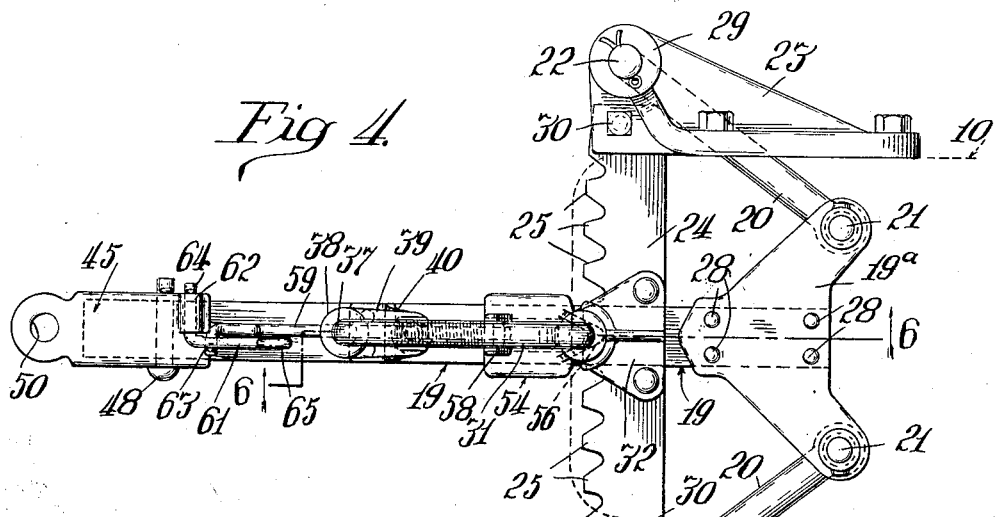
Fig. 4 is an enlarged plan view of the draft attachment.

Referring to the drawings,—10 indicates a tractor which may be of any suitable type, but preferably is a four-wheeled tractor having rear propelling wheels 11, and front steering wheels 12. In the illustrated construction the steering wheels are of the automobile type and are connected to a front axle 13 to be steered by a hand operated steering wheel 14 disposed conveniently to the driver's seat 15. The rear axle is shown at 16 in Fig. 7, and 17 indicates the rear axle housing.

As has been suggested, the draw bar by which connection is made between the tractor and the load to be drawn, which in the present instance will be presumed to be a gang plow, indicated as an entirety by the reference numeral 18, is connected with the tractor frame to swing laterally about a virtual pivot, or effective hitch point, that lies forward of the rear axle of the tractor. As explained in my said application, this point is preferably midway between the front and rear wheels, and is located in the median line of the tractor. In this respect the construction illustrated is substantially the same as that of my said pending application, the draw bar being provided at its forward end with a cross-head, the end portions of which are pivotally connected to the forward ends of forwardly converging laterally swinging links, the rear ends of which are pivotally connected to the tractor frame at opposite sides of the median line of the tractor, and preferably back of the rear axle thereof. Referring particularly to Fig. 1, 19 indicates the draw bar, 19a the cross-head at the forward end thereof, and 20 the forwardly converging links connected at 21 to the opposite end portions of the cross-head 19a. The rear end portions of said links are pivotally connected at 22 to brackets 23 secured to the opposite side faces of the tractor frame adjacent to its rear end. A transverse plate 24 is rigidly secured at its opposite ends to the rear portions of the brackets 23, and in the present construction the rear margin of this plate is notched to provide it with a series of teeth 25, as shown.

Figure 6:
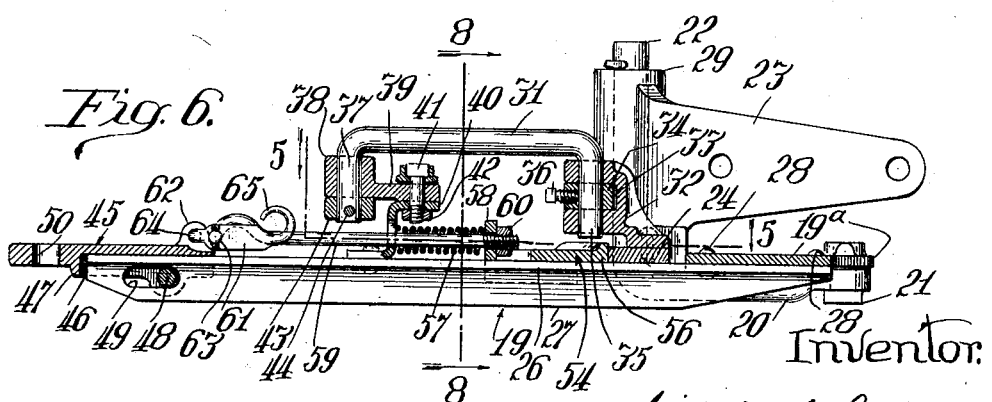
Fig. 6 is a vertical longitudinal section of the draft attachment on line 6—6 of Fig. 4.

In practice the draw bar 19 is made in the form of a T-bar, to provide a flat horizontal portion 26 and a centrally located depending web or flange 27, as best shown in Fig. 8. The forward end of the horizontal portion 26 of said bar extends under the cross-head 19a and is fixedly secured thereto by rivets 28, as best shown in Fig. 4. The links 20 are each made L-shaped to provide a lower horizontal portion that is pivotally connected with the cross-head 19a at 21, as has been explained, and a vertical portion that constitutes the pivot 22 and is journaled in a bearing 29 carried by the bracket 23, as best shown in Figs. 4 and 6. The draw bar extends under the transverse plate 24, the ends of which are preferably connected with the brackets 23 by bolts 30, as shown in Fig. 4. The horizontal portions of the links 20 extend under the brackets 23, as indicated in Fig. 4, and by the construction described they are provided with elongated vertical bearings on said brackets, so that they are firmly supported to resist strains that would tend to distort them.

To provide a laterally swinging support for the rear portion of the draw bar an inverted U-shaped link 31, best shown in Fig. 6, is mounted in a vertical bearing carried by a bracket 32 that is secured to and rises centrally from the transverse plate 24. This bearing is bifurcated, as shown at 33 in Fig. 6, to receive a collar 34 that fits on the downturned end 35 of the link 31 and is secured thereto by a set-screw 36, thus holding said link end in said bearing.

The opposite end of the link is provided with a downturned end 37 that is journaled in a bearing 38 carried by a short link 39 that extends forward from the link end 37 and has pivotal connection with a bracket 40 that is secured to and rises from the horizontal portion 26 of the draw bar. A bolt 41 that passes through the forward end portion of the link 39 and the upper portion of the bracket 40 forms the pivotal connection between these parts. A nut 42 secures said bolt in place. The lower end of the link arm 37 is held in its bearing by a collar 43 and a cotter pin 44, as shown in Fig. 6. From the foregoing description it will be seen that the link 31 may swing laterally about its vertical arm 35 as an axis to carry its rear end to one side or the other of the median line of the tractor, and that the rear portion of the draw bar will be suspended from said link by means of the short link 39 and the bracket 40. The purpose of the short link 39 is to compensate for the fact that the draw bar swings laterally in an arc centered at a point well forward of the forward pivot 35 of the link 31, and the swinging of the short link 39 with reference to the link 31 provides the necessary compensation.

Mounted upon the rear end of the draw bar 19 is a hitch plate 45 that is arranged to slide longitudinally thereon and to form a connection between the draw bar and the load to be attached thereto. This hitch plate is provided with depending side flanges 46 that overlap the side margins of the top portion 26 of the draw bar, and with an end flange 47 that overlies the rear end of said draw bar.

A cross pin 48 is connected to the side flanges 46 and passes through a longitudinal slot 49 in the vertical web 27 of the draw bar, as best shown in Fig. 6. Thus the hitch plate may slide back and forth upon the draw bar within limits, and is held against lateral displacement. Obviously, when a load is attached to the hitch plate 45 forward pull by the tractor will cause the hitch plate to move back along the draw bar until the cross pin 48 reaches the rear end of the slot 49, where it will stop. The hitch plate 45 is shown with a hole 50 for the attachment thereto of a draft connection 51, which in the illustrated construction is connected at its rear end with the clevis plate 52 of the plow, as shown in Fig. 7. Usually a clevis 53 is employed to connect the forward end of the draft connection 51 with the hitch plate 45, to permit lateral swinging thereof with respect to the draw bar 19.

Figure 5:
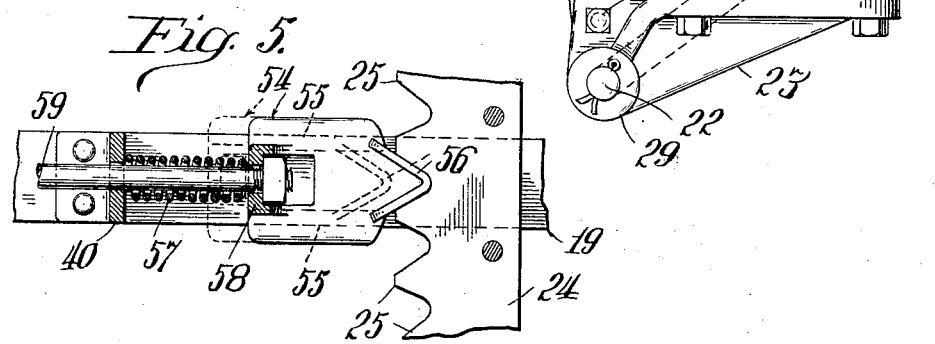
Fig. 5 is a detail, being a partial horizontal sectional view on line 5—5 of Fig. 6.

As best shown in Fig. 5, the draw bar is provided with a slide block or bracket 54 having grooves 55 at its opposite side margins adapted to receive the margins of the horizontal portion 26 of the draw bar, so that said block may slide longitudinally of the draw bar without being displaced laterally. This block is provided at its forward end with a tooth 56 that is adapted to engage in the spaces between the teeth 25 on the transverse plate 24, as shown in Fig. 5. When the parts are so engaged, manifestly the draw bar will be held against lateral swinging with reference to the plate 24 and the tractor. The slide block 54 is normally held in operative relation to the plate 24 by a spring 57 that is interposed between the upright portion of the bracket 40 and an upstanding arm 58 carried by the slide block 54, as best shown in Figs. 5 and 6.

This spring tends to press the slide block 54 forward, and, therefore, to cause the tooth 56 to engage one or another of the teeth of the transverse plate 24. Said spring is mounted upon a longitudinally extending rod 59, the forward end of which passes through suitable holes in the bracket 40 and arm 58, its forward end being secured by a nut 60, which may be adjusted on said rod to adjust the tension of the spring 57. The rear end of the rod 59 is pivotally connected between the ends of a vertically swinging arm 61, which at its rear end is pivoted in a bearing 62 provided at the forward end of the hitch plate 45. As clearly shown in Figs. 4 and 6, the rear end of the rod 59 is bent laterally to form a pivot 63 which has a bearing in the arm 61 forward of the bearing 62, and said arm extends forward from the pivot 63 alongside of the rod 59. The rear end of the arm 61 is also bent laterally to form a pivot 64 that is journaled in the bearing 62. At its forward end the arm 61 is provided with a loop or eye 65.

The purpose of the arrangement just described is to provide for automatically unlocking the draw bar to permit it to swing laterally freely when hauling a load, and to automatically lock the draw bar against lateral swinging when no draft load is imposed upon it; also, to provide convenient means for releasing such lock when there is no load on the draw bar, to permit it to be swung laterally for convenience in attaching a plow or other load to it. It will be observed that when a load is connected to the hitch plate 45, and draft force is applied, the hitch plate will move back along the draw bar until the cross pin 48 reaches the rear end of the slot 49, when further rearward movement thereof is prevented.

This rearward movement of the hitch plate applies a pull to the rod 59 and moves it rearwardly along the draw bar, thereby moving the slide block 54 rearwardly far enough to disengage its tooth 56 from the transverse plate 24, the spring 57 being compressed further by this operation. This will release the draw bar from the plate 24 and leave it free to swing laterally along said plate, and it will remain so as long as draft force is applied to the load. When, however, the load resistance ceases, as when the tractor stops or backs, the spring 57 will immediately force the slide block 54 forward until its tooth 56 engages one of the notches in the transverse plate 24 and thereby locks the draw bar against lateral swinging. Accordingly, when backing a load the draw bar is held in fixed relation to the tractor so far as lateral swinging is concerned and "jack-knifing" is prevented. By supporting the draw bar by means of the transversely swinging link 31 and the short link 39 that cooperates therewith, the draw bar is held up so that it swings freely, and it is adapted to swing through a long flat arc centered a considerable distance forward of the rear wheels of the tractor, the object of which has been explained.

Although the draw bar is automatically locked against lateral swinging when no load resistance is imposed upon it, as has been explained, it may be released to permit it to swing laterally to facilitate coupling a load to it, by swinging the arm 61 backward about its pivot 64, thereby drawing the rod 59 rearwardly through its connection with said arm by the pivot 63.

This draws the slide block 54 rearwardly and releases the lock. The purpose of the eye 65 is to prevent the arm 61 from being thrown over far enough to make a past center lock which would hold the slide block 54 out of operative position upon its release by the operator. If this should happen, and the tractor should be started up with the parts in such position, damage might result from the undue strain imposed upon the parts by the further backward movement of the rod 59 resulting from the imposition of the load resistance upon the hitch plate 45. This would impose draft strains on light parts that are not intended to sustain them. By providing the eye 65 the arm 61 will automatically return to its forward or normal position as soon as the operator releases it, since the tension of the spring 57 will then throw it forward. If it be desired to lock the draw bar against lateral movement while a load is being hauled, the lock releasing devices may be put out of commission by disconnecting the arm 61 from the hitch plate 45. This merely involves slipping the pivot 64 out of the bearing 62. The hitch plate 45 may then move longitudinally of the draw bar within the range permitted by the pin 48 and slot 49 without moving the rod 59. The spring 57 will, therefore, remain operative to hold the slide block 54 in its operative or locking position.

So far as I am aware I am the first in the art to provide a draft attachment comprising a draw bar or equivalent member arranged to swing freely laterally when under draft strain, and to be automatically locked against lateral swinging when such strain ceases, as in backing, and particularly locking devices of that character applied to a draft member arranged to swing laterally about an effective hitch point remote from the actual point or points of connection of the draft member with the tractor or other drawing means.

Therefore, my invention is generic in character and the claims hereinafter made should be construed accordingly. In the embodiment of my invention described the draw bar swings laterally in a horizontal plane, but obviously the means for holding the draw bar against swinging, and for releasing it to permit it to swing, may also be applied to a draw bar arranged to swing laterally in an inclined or in a vertical plane. It should be understood, therefore, that the term "lateral" as applied to the swinging movement of the draw bar refers to its swinging movement with respect to the tractor about its center of oscillation, whether such movement be in a horizontal plane or in some other plane.

I claim:

1. A hitch connection for tractors comprising a draft member connected with the tractor to swing relatively thereto to carry the hitch point of the draft member about a pivotal center remote from the points of physical connection of said draft member with the tractor, means for normally holding said draft member against such swinging, and means, mounted on said draft member and connected with the holding means, operable manually to release said holding means.

2. A hitch connection for tractors comprising a draft member connected with the tractor to swing relatively thereto to carry the hitch point of the draft member about a pivotal center remote from the points of physical connection of said draft member with the tractor, means including a biased member for normally holding said draft member against such swinging, and means operable by the resistance of the load to release said holding means.

3. A hitch connection for tractors comprising a draft member connected with the tractor to swing laterally to carry the hitch point of the draft member about a pivotal center remote from the points of physical connection of said draft member with the tractor, means for normally holding said draft member against lateral swinging, and means mounted on said draft member, and operable, alternatively, manually or by the resistance of the load, to release said holding means.

4. A hitch connection for tractors comprising a draft member connected with the tractor to swing laterally to carry the hitch point of the draft member about a pivotal center remote from the points of physical connection of said draft member with the tractor, means for normally holding said draft member against lateral swinging, and means, mounted on said draft member, operable by the resistance of the load to release said holding means.

5. A hitch connection for tractors comprising a draft member connected with the tractor to swing laterally to carry the hitch point of the draft member about a pivotal center remote from the points of physical connection of said draft member with the tractor, means for normally holding said draft member against lateral swinging, a hitch member mounted on said draft member to move longitudinally with respect thereto, and means actuated by movement of said hitch member to release said holding means.

6. A hitch connection for tractors comprising a draw bar connected with the tractor to swing laterally to carry the hitch point of the draw bar about a pivotal center remote from the points of physical connection of said draw bar with the tractor, means for normally holding said draw bar against lateral swinging, a hitch member slidably mounted upon the draw bar, and means connecting said hitch member with said holding means and operable by movement of said hitch member effected by load resistance to release said holding means.

7. A hitch connection for tractors comprising a draw bar connected with the tractor to swing laterally to carry the hitch point of the draw bar about a pivotal center remote from the points of physical connection of said draw bar with the tractor, means for normally holding said draw bar against lateral swinging, a hitch member slidably mounted upon the draw bar, and means connecting said hitch member with said holding means and operable, alternatively, manually or by load resistance to release said holding means.

8. A hitch connection for tractors comprising a draw bar connected with the tractor to swing laterally, holding means including a biased member for normally holding said draw bar against lateral swinging, and means actuated by the resistance of the load for releasing said holding means, said releasing means including a manually operable means for releasing the holding means.

9. A hitch connection for tractors comprising a draw bar connected with the tractor to swing laterally, holding means including a biased member for normally holding said draw bar against lateral swinging, a hitch member connected with the draw bar to transmit the draft therefrom to the load and having a limited range of longitudinal movement with respect to the draw bar, and means connected with said hitch member and actuated by movement thereof effected by load resistance to release said holding means, said releasing means including means operable manually for releasing the holding means.

10. A hitch connection for tractors comprising a draw bar pivotally connected with the tractor to swing laterally, devices, carried by the tractor and by said draw bar, adapted to cooperate to hold the draw bar against lateral swinging, a hitch member mounted on the draw bar to move relatively thereto under the resistance of the load, and means actuated by movement of said hitch member for releasing said holding means.

11. A hitch connection for tractors comprising a draw bar pivotally connected with the tractor to swing laterally, a transverse plate carried by the tractor, a slide block carried by the draw bar and movable into engagement with said transverse plate to hold the draw bar against lateral swinging, a spring normally holding said slide block in its operative position, a hitch member mounted on the draw bar and movable thereon under the resistance of the load, and a connection between said hitch member and said slide block for moving said slide block out of operative position by movement of said hitch member under the resistance of the load.

12. A hitch connection for tractors comprising a draw bar pivotally connected with the tractor to swing laterally, a transverse plate carried by the tractor, a slide block carried by the draw bar and movable into engagement with said transverse plate to hold the draw bar against lateral swinging, a spring normally holding said slide block in its operative position, a hitch member mounted on the draw bar and movable thereon under the resistance of the load, and a connection between said hitch member and said slide block for moving said slide block out of operative position by movement of said hitch member under the resistance of the load, said connection including means operable manually to move said slide block out of operative position.

13. A hitch connection for tractors comprising a draw bar pivotally connected at its front portion with the tractor to swing laterally, a laterally swinging member mounted on the tractor and supporting the rear portion of the draw bar, devices carried by the draw bar and the tractor, respectively, and cooperating to normally hold the draw bar against lateral swinging, and means actuated by the resistance of the load to release said holding means.

14. A hitch connection for tractors comprising a draw bar pivotally connected with the tractor at its front portion to swing laterally relative to the tractor to carry the hitch point of the draw bar about a pivotal center remote from its physical connection therewith, a swinging member mounted on the tractor and connected with the rear portion of the draw bar for supporting said portion against vertical movement, and means for normally holding the draw bar against lateral swinging when the tractor is backed.

15. A hitch connection for tractors comprising a draw bar pivotally connected with the tractor at its front portion to swing laterally relative to the tractor to carry the hitch point of the draw bar about a pivotal center remote from its physical connection therewith, a swinging member mounted on the tractor and connected with the rear portion of the draw bar for supporting the same, means for normally holding the draw bar against lateral swinging, and means operable by the resistance of the load to release said holding means.

16. A hitch connection for tractors comprising a draw bar pivotally connected with the tractor to swing laterally relative to the tractor to carry the hitch point of the draw bar about a pivotal center remote from the physical connection thereof with the tractor, a laterally swinging link journaled on the tractor, a second link pivotally connected with said link to swing therewith and relatively thereto, said second link being connected with the draw bar to support the rear portion thereof as it swings laterally, and means for connecting the rear portion of the draw bar with the load.

17. A hitch connection for tractors comprising a draw bar pivotally connected with the tractor to swing laterally relatively thereto to carry the hitch point of the draw bar about a pivotal center remote from the physical connection thereof with the tractor, a laterally swinging link journaled on the tractor, a second link pivotally connected with said link to swing therewith and relatively thereto, said second link being connected with the draw bar to support the rear portion thereof as it swings laterally, means for normally holding the draw bar against lateral movement, a hitch member movable relatively to the draw bar, and means operable by movement of said hitch member to release said holding means.

18. A hitch connection for tractors comprising a draw bar pivotally connected with the tractor to swing laterally relatively thereto to carry the hitch point of the draw bar about a pivotal center remote from the physical connection thereof with the tractor, a laterally swinging link journaled on the tractor, a second link pivotally connected with said link to swing therewith and relatively thereto, said second link being connected with the draw bar to support the rear portion thereof as it swings laterally, devices carried, respectively, by the draw bar and tractor, adapted to cooperate to normally hold the draw bar against lateral movement, a hitch member movable relatively to the draw bar under the resistance of the load, and means operable by movement of said hitch member to release said holding means.

19. A hitch connection for a vehicle, comprising a draw bar associated with the vehicle, means adapted to floatingly support said draw bar for simultaneous bodily and swinging movement in response to variation of the line of travel of the vehicle, to carry the actual hitch point of the load about a pivotal center lying beyond the end of said draw bar and beyond said supporting means, biased means carried by the draw bar for automatically holding the draw bar against said movement, and means operable by the resistance of the load to release said holding means.

20. A hitch connection for vehicles, comprising a draw bar associated therewith, normally free cooperating swinging links connected at one end with the vehicle and having their opposite ends free to float with respect to the vehicle, and connected with opposite sides of the draw bar, and operating upon variation of the line of travel of the vehicle to move the draw bar bodily laterally and also to swing it laterally, a plate secured to the vehicle, means cooperating with the plate and draw bar for automatically holding said draw bar against lateral movement relative to the tractor, and means operable by the resistance of the load to release said holding means.

21. The combination with a vehicle, of a draft attachment therefor comprising a draw bar, floating supporting means carried by the vehicle adjacent to one end thereof, for supporting said draw bar for bodily and swinging movement relatively to the vehicle in response to lateral deflections of the line of draft, spring pressed means carried by the draw bar and cooperating with the tractor for preventing lateral movement of the draw bar, and yielding means actuated by load resistance to release said spring pressed means.

22. The combination with a tractor, of a draft connection comprising a draft member, floating means carried by the tractor and connecting said draft member therewith to move bodily relatively thereto and to swing about a point remote from the point of physical connection of said draft member with the tractor, automatic means to fix the position of the draft member relative to the tractor when the load is released, and means actuated by the application of the load to release said automatic means.

23. A hitch connection for tractors comprising a draft member connected with the tractor for bodily and swinging movement transversely of the tractor to carry the hitch point of the load about an axis disposed outside of the structure of the draw bar, means for normally holding said draft member against such movement, and swingable means manually operable and associated with the holding means to effect releasement of said holding means.

24. A hitch connection for a vehicle, comprising a draw bar associated with the vehicle, means adapted to floatingly support said draw bar for simultaneous bodily and swinging movement in response to variation of the line of travel of the vehicle, biased means carried by the draw bar for automatically holding the draw bar against said movement, and means operable by the resistance of the load to release said holding means.

WILLIAM L. PAUL.